Jan. 1, 1957 W. D. MISCHLER 2,776,373
FREQUENCY CONVERSION CIRCUITS
Filed Dec. 14, 1953
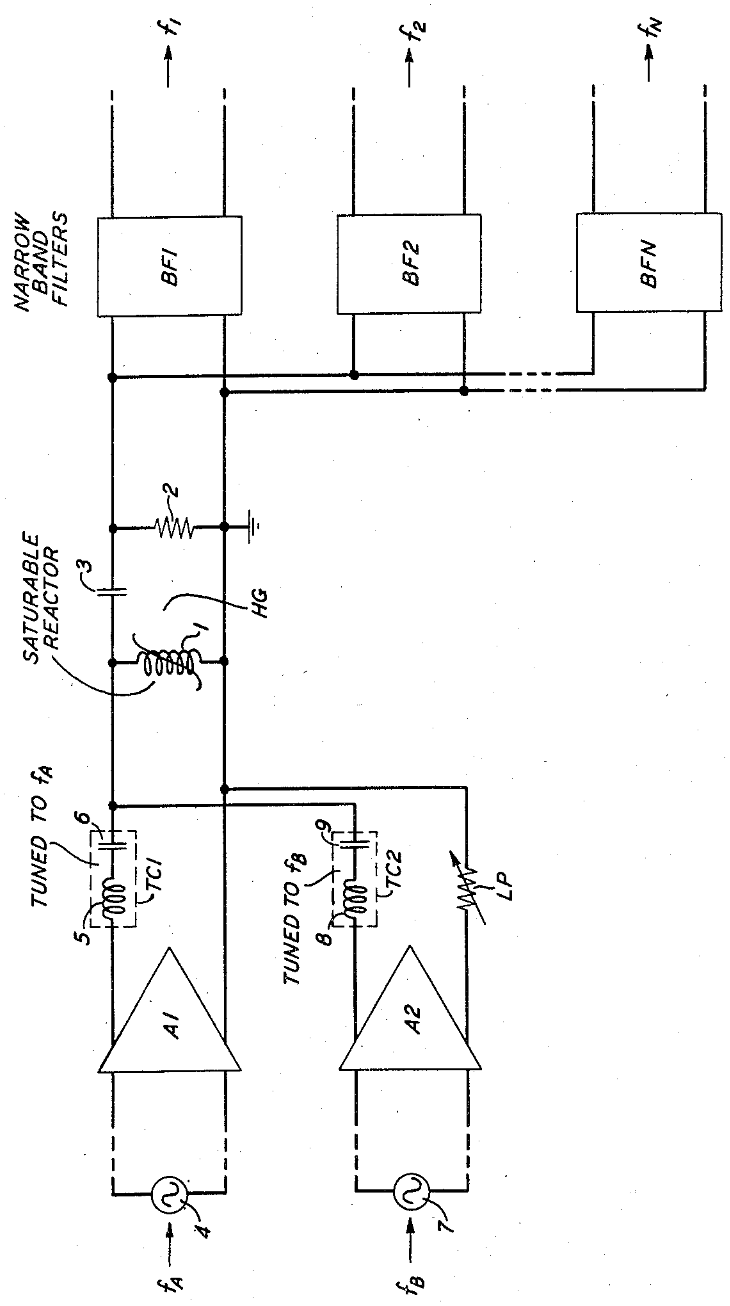
INVENTOR
W. D. MISCHLER
BY
Earl C. Laughlin
ATTORNEY 2,776,373

FREQUENCY CONVERSION CIRCUITS

Warren D. Mischler, Berkeley Heights, N. J., assignor to Bell Telephone Laboratories, Incorporated, New York, N. Y., a corporation of New York Application December 14, 1953, Serial No. 398,120

3 Claims. (Cl. 250—36)

The invention relates to frequency conversion circuits, and particularly to the simultaneous generation of a number of alternating waves of different single frequencies by frequency conversion of waves of other frequencies using a modulation and selection process.

Harmonic generators of the saturable reactor type have been employed for many years in broad-band carrier communication systems for producing from a single frequency wave input a plurality of waves of frequencies which are harmonics of that frequency, having a uniformly large amplitude over a wide frequency range. These harmonics have been respectively employed for the different channel carriers or pilots of such systems. Such magnetic harmonic generators, and also modulators of the magnetic type, have heretofore also been employed as modulators for combining two alternating current waves of different frequencies, for example, a voice signal wave and a single frequency carrier wave, to produce a combination modulated wave having a band of frequencies including the sum and difference (sideband) components and unmodulated components of the original waves; or as demodulators for detecting and directing into different circuits the individual alternating current waves combined in such a combination wave.

An object of the invention is to generate efficiently by a process of modulation and selection a number of different, single frequency alternating current waves of substantial amplitudes.

A related but more specific object is to simultaneously produce by the use of simple and economical frequency conversion apparatus a plurality of alternating current waves of desired different single frequencies and of desired amplitudes from two alternating current waves of other frequencies either of which may or may not be non-harmonically related to the frequencies of the produced waves.

These objects are attained in accordance with the invention by the provision of means for simultaneously applying two alternating current waves of selected different frequencies, which may or may not be harmonically related to each other, supplied from separate sources, to the input of a harmonic generator of the saturable reactor type, and of suitably designed filters in different branch output circuits for respectively selecting one of a number of alternating current waves of the desired single frequencies, harmonically or non-harmonically related to the frequency of the input waves, from the resulting sum and difference modulation products appearing in the output of the harmonic generator.

In one embodiment of the invention, the two single frequency alternating current input waves are applied in parallel from a primary circuit to a non-linear inductance coil having a saturable magnetic core, or a harmonic generator, through individual amplifiers capable of individual gain adjustment. Individual tuned circuits, respectively selective to a different one of the two input frequencies, are connected in series with the output of each amplifier. The desired single frequency output waves, harmonically or non-harmonically related to the frequencies of the input waves, are respectively selected from the sum and difference modulation products appearing in the output of the harmonic generator. The output, or secondary, circuit of the harmonic generator comprises a resistive impedance and a series capacitor connected across the non-linear coil. A different one of a plurality of filters connected in parallel across the resistive impedance in that circuit selects an output wave of the desired frequency.

The various objects and features of the invention will be better understood from the following detailed description thereof when read in conjunction with the accompanying drawing the single figure of which shows one embodiment of the circuit of the invention in block schematic form.

As shown in the drawing, the alternating wave generator of the invention includes a harmonic generator HG, which, as illustrated, may be of the general type disclosed in the United States patent to L. R. Wrathall, 2,117,752, issued May 17, 1938. This harmonic generator includes a non-linear inductance coil 1 of the unpolarized type, having a saturable magnetic core of a suitable structure (for example, of Permalloy in laminated or spiral tape form) and a secondary circuit comprising a highly resistive impedance 2 and a capacitor 3 connected in series across the non-linear inductance coil 1. In the manner explained in the aforementiotned Wrathall patent, with suitable constants for the elements in the secondary circuit, such a harmonic generator is adapted to produce in that circuit a group of odd harmonics of the fundamental frequency of any alternating current wave which may be applied to the non-linear coil 1 from a primary (input) circuit, which harmonics will be of uniformly large amplitudes over a desired frequency range.

In the circuit of the invention as shown in the drawing, two alternating current waves of selected single frequencies are applied to the input of the harmonic generator HG. One of these waves of a frequency $f_A$ is supplied from a source 4, which may be a piezoelectric crystal-controlled vacuum tube oscillator, which is connected through an amplifier A1 and a series tuned circuit TC1 comprising a linear inductance coil 5 and a capacitor 6 in series with each other, across the non-linear coil 1 of the harmonic generator. The second wave of a frequency $f_B$ is supplied from a similar source 7 which is connected through a second amplifier A2 and a second series tuned circuit TC2 comprising the linear inductance coil 8 and the capacitor 9 in series with each other, across the non-linear coil 1 of the harmonic generator, in parallel with the source 4. The tuned circuits TC1 and TC2 are designed to selectively pass the frequencies $f_A$ and $f_B$, respectively, and to reject the pass frequencies $f_B$ or $f_A$, respectively, of the other tuned circuit. A plurality of narrow band filters BF1, BF2–BFN, respectively adapted for selectively passing waves of desired single frequencies $f_1$, $f_2$–$f_n$ harmonically or non-harmonically related to the input frequencies $f_A$ and $f_B$, to separate output circuits, are connected in parallel across the resistive impedance 2 in the output circuit of the harmonic generator HG.

The input waves of frequencies $f_A$ and $f_B$ are applied in amplified form simultaneously to the non-linear coil 1 of the harmonic generator HG, and are combined therein. The non-linear coil 1 becomes a relatively high inductance for a portion of the applied alternating current waves of frequencies $f_A$ and $f_B$ when the applied current waves are near zero amplitude, but provides a low impedance (because its magnetic core becomes saturated) when the applied current waves exceed a certain critical value. As the current through the coil 1 decreases toward zero a portion of this current flows into the capacitor 3 charging it. When the current through the non-linear coil 1 reaches a critical value, its impedance is reduced very quickly to a low value, and the capacitor 3 discharges through the resistive impedance 2 and the coil 1, thus producing a sharply peaked current wave therein, which is rich in cross modulation products. This cycle is repeated in the opposite direction in another portion of the applied waves, causing a highly peaked current wave in the negative direction.

The distortion products thus produced in the resistive impedance 2 of the harmonic generator HG are applied in parallel to the narrow band filters BF1, BF2–BFN, which are respectively designed to select from these products and pass to a different output circuit waves of the desired single frequencies $f_1$, $f_2$–$f_n$ which are higher than either of the two input frequencies $f_A$ and $f_B$ and may be harmonically or non-harmonically related thereto. These frequencies bear the following relations to the input frequencies:

(1) $$f_1=a_1f_A+b_1f_B$$

(2) $$f_2=a_2f_A+b_2f_B$$

(3) $$f_N=a_nf_A+b_nf_B$$

where $a_1$, $a_2$–$a_n$ and $b_1$, $b_2$–$b_n$ are integers and may be either positive or negative.

If one input frequency, say $f_A$, is a harmonic of the other, $f_B$, and it is desired that the higher frequency $f_A$ predominate in the combination products, the amplitudes of the applied input currents are relatively adjusted by any suitable means, for example, by suitably adjusting the value of a variable loss pad LP in the output of the amplifier A2, so that the amplitude of the higher frequency current $f_A$ through the non-linear coil 1 is several times as large as the amplitude of the lower frequency current $f_B$ therethrough. In addition, since the amplitudes of the desired harmonic outputs are critical functions of the currents driving the reactor (non-linear coil) 1, these currents are preferably stabilized, for example, by overdriving the amplifiers A1, A2 in such a way that the desired current amplitudes are in the overloaded portions of the amplifier input-output characteristics and consequently vary little with considerable variations in amplifier input.

In a commercial carrier system in which the frequency conversion circuit of the invention was used, the input waves $f_A$ and $f_B$ applied to the harmonic generator were of the frequencies 4 kilocycles and 128 kilocycles, respectively, the 4 kc. input wave being the basic frequency wave supplied by a suitable crystal-controlled vacuum tube oscillator, and the 128 kc. wave the 32nd harmonic of the 4 kc. frequency; and the frequencies $f_1$ to $f_4$ of the output waves selected from the modulation products of the combined input waves in the output of the harmonic generator by the output filters BF1 to BF4, respectively, were of the frequencies 216, 516, 520 and 556 kilocycles, respectively; and were used for the channel carriers and pilot waves, or in connection with the production of the latter, in the commercial system. In the commercial circuit, the 216 kc. filter BF1 was designed to select products made up of the second harmonic of 128 kc. minus the 10th harmonic of 4 kc.; the 516 kc. filter BF2 to select products made up of the 4th harmonic of 128 kc. plus the fundamental of 4 kc.; the 520 kc. filter BF3 to select products made up of the 4th harmonic of 128 kc. plus the 2nd harmonic of 4 kc.; and the 556 kc. filter BF4 to select the products made up of the 4th harmonic of 128 kc. plus the 11th harmonic of 4 kc.

It is to be understood that the constructions of the apparatus in the circuits of the invention and the values of the frequencies of the waves may vary somewhat from those specified above. Various other modifications of the circuit described and illustrated which are within the spirit and scope of the invention will occur to persons skilled in the art.

What is claimed is:

1. A frequency conversion circuit comprising two similar sources of input waves of different single frequencies, means for producing sum and difference modulation products of the said two input waves comprising a harmonic generator of the saturable reactor type and means for simultaneously applying to the input of said harmonic generator the two said input waves, an output circuit for said harmonic generator, and separate filtering means for respectively selecting from said sum and difference modulation products appearing in said output circuit desired waves of different single frequencies harmonically or non-harmonically related to the frequencies of said input waves.

2. The circuit of claim 1 in which the frequency of one of said two input waves is a harmonic of the frequency of the other input wave, and the input circuits to said harmonic generator include means for making the amplitude of one of the input waves applied to said harmonic generator several times as large as that of the other applied input wave, so that the frequency of the higher amplitude wave will predominate in the combination products.

3. The circuit of claim 1, in which said two input waves are applied to said harmonic generator through individual amplifiers for providing a desired amount of amplification and individual tuned circuits respectively selective to a different one of the two input waves, and to stabilize the amplitudes of said output waves of desired different single frequencies, which are critical functions of the amplitudes of the waves applied to the input of said harmonic generator, said amplifiers are overdriven in such a way that the desired amplitudes of the applied waves are in the overloaded portions of the amplifier input-output characteristics, and thus vary little with considerable variation in amplifier inputs.

References Cited in the file of this patent

UNITED STATES PATENTS

| | | |
|---|---|---|
| 2,117,752 | Wrathall | May 17, 1938 |
| 2,146,053 | Campbell et al. | Feb. 7, 1939 |
| 2,575,993 | Bennett et al. | Nov. 20, 1951 |

FOREIGN PATENTS

| | | |
|---|---|---|
| 114,943 | Sweden | Sept. 18, 1945 |